United States Patent
Kanaev et al.

(10) Patent No.: US 9,230,303 B2
(45) Date of Patent: Jan. 5, 2016

(54) MULTI-FRAME SUPER-RESOLUTION OF IMAGE SEQUENCE WITH ARBITRARY MOTION PATTERNS

(71) Applicants: Andrey V. Kanaev, Lorton, VA (US); Christopher W. Miller, Rockville, MD (US)

(72) Inventors: Andrey V. Kanaev, Lorton, VA (US); Christopher W. Miller, Rockville, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 36 days.

(21) Appl. No.: 14/253,149

(22) Filed: Apr. 15, 2014

(65) Prior Publication Data

US 2014/0307982 A1    Oct. 16, 2014

Related U.S. Application Data

(60) Provisional application No. 61/812,477, filed on Apr. 16, 2013.

(51) Int. Cl.
*G06K 9/32* (2006.01)
*G06T 3/40* (2006.01)
*G06T 7/20* (2006.01)

(52) U.S. Cl.
CPC ............. *G06T 3/4053* (2013.01); *G06T 7/2066* (2013.01); *G06K 9/32* (2013.01)

(58) Field of Classification Search
CPC ............. G06K 9/6253; H04N 7/0125; H04N 13/0221; H04N 9/097; G06T 3/4053; G06T 2207/20221; G02B 21/361
USPC .................. 382/106, 254, 299, 302, 284, 298
See application file for complete search history.

(56) References Cited

U.S. PATENT DOCUMENTS

| | | | | |
|---|---|---|---|---|
| 5,557,684 A | * | 9/1996 | Wang | G06K 9/38 348/E5.066 |
| 6,370,196 B1 | * | 4/2002 | Griessl | H04N 19/543 375/240.16 |
| 7,119,837 B2 | * | 10/2006 | Soupliotis | H04N 5/23248 348/208.99 |
| 2004/0001705 A1 | * | 1/2004 | Soupliotis | H04N 5/23248 386/242 |
| 2004/0252230 A1 | * | 12/2004 | Winder | G06T 7/2053 348/402.1 |
| 2005/0232514 A1 | * | 10/2005 | Chen | G06T 3/4053 382/298 |

(Continued)

OTHER PUBLICATIONS

S. C. Park, M. K. Park, and M. G. Kang, "Super-resolution image reconstruction: A technical overview," IEEE Signal Process Magazine 20(3), pp. 21-36 (May 2003).

(Continued)

*Primary Examiner* — Vu Le
*Assistant Examiner* — Aklilu Woldemariam
(74) *Attorney, Agent, or Firm* — US Naval Research Laboratory; Richard F. Bis

(57) ABSTRACT

A computer implemented method is provided for computing a two-way optical flow between a reference frame and one or more associated frames in an optical flow module. A forward warping operator and a backward warping operator can be generated between the reference frame and each of the one or more associated frames in a warping module. The forward warping operator and the backward warping operator provide motion compensation between the frames. Weights for each of the forward warping operators and the backward warping operators can be computed in a weight module. The weights correspond to uncertainty of motion estimation. A super resolution iteration algorithm can be calculated in a super-resolution iteration module.

7 Claims, 1 Drawing Sheet

(56) References Cited

U.S. PATENT DOCUMENTS

| | | | | |
|---|---|---|---|---|
| 2006/0083440 | A1* | 4/2006 | Chen | H04N 5/23238 382/284 |
| 2010/0098340 | A1* | 4/2010 | Zomet | G02B 27/2214 382/206 |
| 2011/0293146 | A1* | 12/2011 | Grycewicz | G06T 7/0026 382/106 |
| 2012/0147205 | A1* | 6/2012 | Lelescu | H04N 13/0029 348/218.1 |
| 2012/0300122 | A1* | 11/2012 | Liu | H04N 7/0137 348/441 |
| 2012/0307155 | A1* | 12/2012 | Gleicher | G06T 3/0093 348/581 |
| 2013/0114892 | A1* | 5/2013 | Vandame | G06T 3/4053 382/162 |

OTHER PUBLICATIONS

R. C. Hardie and K. J. Barnard, "Fast super-resolution using an adaptive Wiener filter with robustness to local motion," Opt. Express, 20(19), pp. 21053-21073 (Aug. 2012).
S. P. Belekos, N. P. Galatsanos, and A. K. Katsaggelos, "Maximum a posteriori video super-resolution using a new multichannel image prior," IEEE Trans. on Image Process., 19(6), pp. 1451-1464, ( Jun. 2010).
M. K. Park, M. G. Kang, and A. K. Katsaggelos, "Regularized high-resolution image reconstruction considering inaccurate motion information," Opt. Eng. 46(11), pp. 117004(1-12), (Nov. 2007).
O. A. Omer and T. Tanaka, "Multiframe image and video super-resolution algorithm with inaccurate motion registration errors rejection," Proc. SPIE 6822, pp. 682222(1-9) (Jan. 2008).
O. A. Omer and T. Tanaka, "Region-based weighted-norm with adaptive regularization for resolution enhancement," Digital Signal Processing 21(4), pp. 508-516, (Mar. 2011).
Mitzel, D., Pock, T., Schoenemann, T., and Cremers, D., "Video super resolution using duality based TV-L1 optical flow," Lecture Notes in Computer Science 5748, pp. 432-441 (Sep. 2009).
M. Unger, T. Pock, M. Werlberger, and H. Bischof, "A convex approach for variational super-resolution," Lecture Notes in Computer Science, 6376, pp. 313-322 (Sep. 2010).
C. Liu, D. Sun, "A Bayesian approach to adaptive video super resolution," in Proceeding of Computer Vision and Pattern Recognition IEEE Conference, pp. 209-216 (Jun. 2011).
A. Danielyan, A. Foi, V. Katkovnik, and K. Egiazarian, "Image and video super-resolution via spatially adaptive block-matching filtering," in Proceedings of Int. Workshop on Local and Non-Local Approx. in Image Processing, Lausanne, Switzerland, Aug. 23-24, 2008.
M. Protter, M. Elad, H. Takeda, and P. Milanfar, "Generalizing the Nonlocal-Means to Super-Resolution Reconstruction," IEEE Trans. on Image Process., 18(1), pp. 36-51, (Jan. 2009).
H. Takeda, P. Milanfar, M. Protter, and M. Elad, "Super-resolution without explicit subpixel motion estimation", IEEE Trans. on Image Process., 18(9), pp. 1958-1975, (Sep. 2009).
D. Sun, S. Roth, and M.J. Black, "Secrets of optical flow estimation and their principles," in Proceeding of 2010 IEEE Conference o Computer Vision and Pattern Recognition Conference, pp. 2432-2439 (Jun. 2010).
L. Xu, J. Jia, and Y. Matsushita, "Motion detail preserving optical flow estimation," IEEE Trans. on Pattern Anal. and Machine Intell., 34(9), pp. 1744-1757, (Sep. 2012).
T. Brox and J. Malik. "Large displacement optical flow: descriptor matching in variational motion estimation", IEEE Trans. on Pattern Anal. and Machine Intell., 33(3), pp. 500-513, (Mar. 2011).
H. Zimmer, A. Bruhn, J. Weickert, L. Valgaerts, A. Salgado, B. Rosenhahn, and H.-P. Seidel. "Complementary optic flow," Lecture Notes in Computer Science, 5681, pp. 207-220, (Aug. 2009).
T. Brox, A. Bruhn, N. Papenberg, and J. Weickert, "High accuracy optical flow estimation based on a theory for warping," Lecture Notes in Computer Science, 3024, pp. 25-36, (May 2004).
S. Baker, D. Scharstein, J. P. Lewis, S. Roth, M. J. Black, and R. Szeliski, "A database and evaluation methodology for optical flow," Int. J. Comput. Vision, 92(1), pp. 1-31, (Mar. 2011).
K. Dabov, A. Foi, V. Katkovnik, and K. Egiazarian, "Image denoising by sparse 3D transform-domain collaborative filtering," IEEE Trans. on Image Process., 16(8), pp. 2080-2095, (Aug. 2007).
D. G. Lowe, "Distinctive image features from scale-invariant keypoints," Int. J. Computer Vision, 60(2), pp. 91-110, (Nov. 2004).
A. V. Kanaev, "Confidence measures of optical flow estimation suitable for multi-frame super-resolution," Proc. SPIE 8399, 839903(pp. 1-12), Apr. 2012.
A. Bruhn. and J. Weickert, "A confidence measure for variational optic flow methods," in Geometric Properties for Incomplete Data, Springer-Verlag, vol. 31, pp. 283-298, Jan. 2006.
K. Dabov, A. Foi, V. Katkovnik, and K. Egiazarian, "Image restoration by sparse 3D transform-domain collaborative filtering," Proc. SPIE 6812, 681207(pp. 1-12), Jan. 2008.
Vandame, Benoît. "Fast and Efficient Resampling for Multi-Frame Super-Resolution," Proceedings of the 21st European Signal Processing Conference (EUSIPCO). Sep. 13, 2013, Cesson Sévigné, France.

* cited by examiner

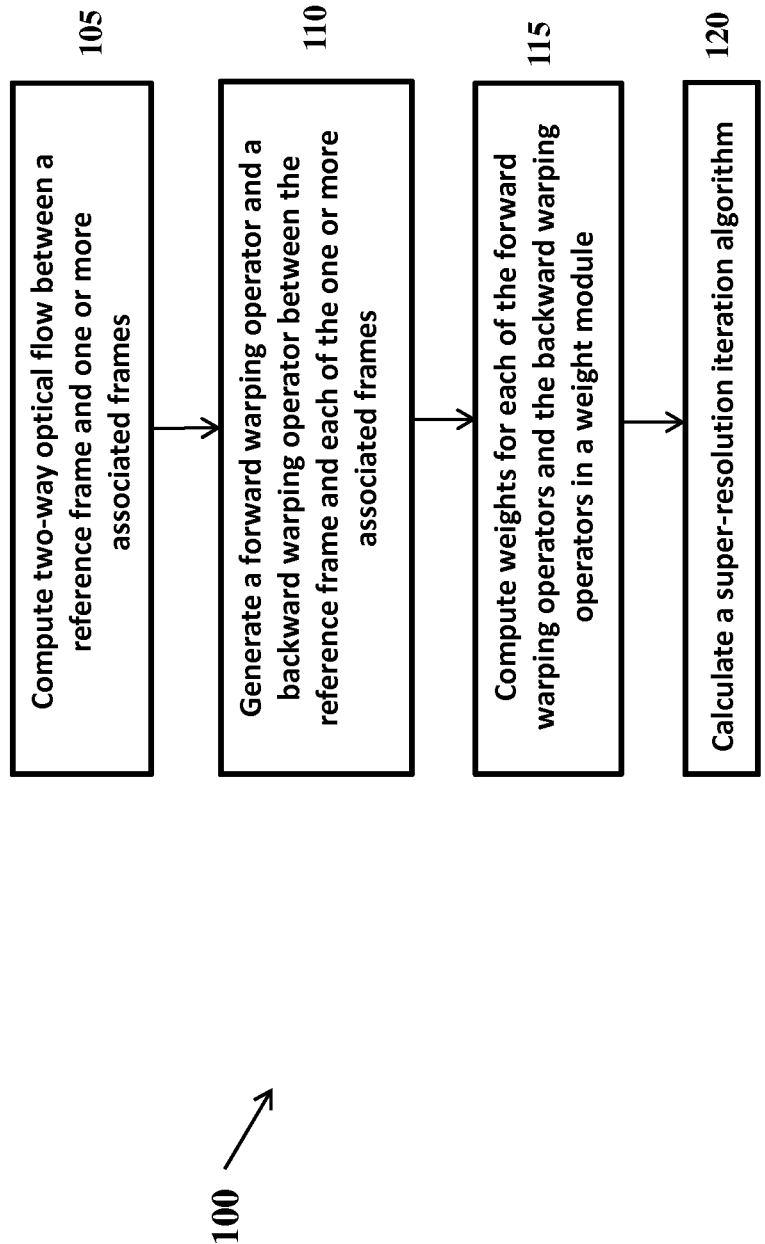

MULTI-FRAME SUPER-RESOLUTION OF IMAGE SEQUENCE WITH ARBITRARY MOTION PATTERNS

CROSS-REFERENCE TO RELATED APPLICATIONS

This application claims priority to provisional patent application entitled, "Multi-Frame Super-Resolution of Image Sequence With Arbitrary Motion Patterns," filed on Apr. 16, 2013, and assigned U.S. Application No. 61/812,477; the entire contents of which are hereby incorporated by reference.

FIELD OF THE INVENTION

The present disclosure relates generally to image processing, and more particularly, to image processing utilizing multi-frame super-resolution algorithms.

BACKGROUND

Multi-frame super-resolution algorithms have been a focus of image processing research for several decades. These algorithms typically seek to produce a high-resolution image by combining sampling limited low-resolution images of the same scene collected over a short time interval. Classical approaches typically rely on accurate sub-pixel motion estimation between the low-resolution images, which can be a difficult problem for arbitrary motion patterns. As a result, successful super-resolution performance was initially demonstrated only in cases of simple global motion, e.g., uniform translations or rotations, and then in more general cases where the motion was described using a global affine motion models. More recently, some progress has been achieved in cases containing relatively simple local motion fields with one or two objects moving through a scene, in a straightforward manner, with small relative displacements accumulated through the whole sequence.

Modern optical flow (OF) algorithms can be capable of estimating such motion fields with the required sub-pixel accuracy. However, these model scenes are rarely representative of real life situations. The more complex motion patterns present in real life image sequences typically cause OF algorithms to experience significant problems, invalidating their underlying models. Uncertainty of motion estimation can be modeled using a Bayesian approach leading to significant improvement in super-resolution. However, the errors arising from estimation of the most complex scene movements still produce distortions in the final high-resolution images.

Therefore, there is still a need in the art for super-resolving images containing complex motion patterns that present a significant challenge to motion estimation techniques despite the recent progress of OF algorithms. The most prevalent modern approach to motion estimation is to pose the problem in a variational form with a global smoothness constraint. Some recent OF algorithms can accurately compute motion fields containing irregularities, e.g., discontinuities, occlusions, and brightness constancy violations. However, estimation of large displacements remains difficult because the solution that is obtained as a result of local optimization is biased towards initialization, which is usually a zero motion field. The coarse-to-fine approach adopted by the modern OF algorithms can somewhat alleviate this problem by first computing an estimate on the coarser scales and then refining this estimate at finer scales. However, these algorithms tend to bias the motion of finer features towards the motion of the larger scale structures. Thus, the motion patterns in which small structures move in a different way from larger scale structures, and motion patterns where the relative motion of small scale structures are larger than their own scale represent the most difficult problem for modern OF algorithms.

One category of image sequence where such motion arises is human motion. This is because relatively small body parts such as hands or legs move extremely fast relative to their own size. The most recent attempt to resolve nonconforming motion of different scale structures has been made by the addition of local descriptors such as SIFT and HOG features to the variational OF formulation. Unfortunately, the interpolation error of such algorithms does not experience dramatic improvement compared to optical flow algorithms that do not use descriptors. In addition, rich features generally rely on large pixel counts, which diminish the applicability of these optical flow algorithms to the low resolution images used in super-resolution processing.

Within the context of super-resolution, failure to estimate local motion details leads to lack of resolution, spurious image distortions, and reduced dynamic range of the resulting image. Super-resolution techniques that use implicit motion estimation via block matching have been developed recently and are generally free of the motion induced image processing artifacts inherent to classical algorithms. They are able to provide image resolution enhancement to real life video sequences. However, the demonstrated resolution enhancement factor of nonlocal methods has generally been modest. Additionally, nonlocal techniques experience block matching difficulties with large displacements, rotational motion, and blurred edges.

Accordingly, there remains a need in the art for a super-resolution algorithm that addresses the problems of motion estimation errors.

SUMMARY OF THE INVENTION

According to one aspect of the invention, a computer implemented method is described for computing a two-way optical flow between a reference frame and one or more associated frames in an optical flow module. A forward warping operator and a backward warping operator can be generated between the reference frame and each of the one or more associated frames in a warping module. The forward warping operator and the backward warping operator provide motion compensation between the frames. Weights for each of the forward warping operators and the backward warping operators can be computed in a weight module. The weights correspond to uncertainty of motion estimation. A super resolution iteration algorithm can be calculated in a super-resolution iteration module.

According to another aspect of the invention, a computer implemented system is described that includes an optical flow module configured to compute a two-way optical flow between a reference frame and one or more associated frames. A warping module can be configured to provide motion compensation between the reference frame and each of the one or more associated frames. A weight module can be configured to compute weights for each of the forward warping operators and the backward warping operators. A super-resolution iteration module can be configured to calculate a super resolution iteration algorithm. The optical flow module, warping module, weight module, and super-resolution iteration module can be implemented in a computer system that comprises instructions stored in a machine-readable medium and a processor that executes the instructions.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which:

FIG. 1 is a flow chart of a super-resolution iteration method in accordance with an exemplary embodiment of the invention.

DETAILED DESCRIPTION OF EXEMPLARY EMBODIMENTS

One or more embodiments or implementations are hereinafter described in conjunction with the drawings, where like reference numerals refer to like elements throughout, and where the various features are not necessarily drawn to scale.

In general, a novel super-resolution algorithm is described that follows a variational approach, and addresses the problems of motion estimation errors. A two-way optical flow computation between the reference image and other images in the sequence can be employed to reduce errors due to occlusions. Other motion estimation errors can be accounted for by implementation of a corresponding set of two-way weights that represents uncertainty measures designed to approximate the interpolation error of the OF algorithm. The presented super-resolution framework can be implemented with any optical flow algorithm, however its performance will depend on the accuracy of that particular algorithm.

FIG. 1 is a flow chart 100 of a super-resolution iteration method in accordance with an exemplary embodiment of the invention. In step 105, a two-way optical flow can be computed between a reference image, or reference frame, and one or more other associated images, or frames. More specifically, the optical flow can be computed forwards and backwards and can provide a motion estimation. For example, in a sequence of eight frames, or images, frame 5 can be selected as the reference frame. The optical flow can be computed forwards between frame 3 and frame 5, as well as backwards between frame 5 and frame 3. Furthermore, the optical flow can also be computed forwards and backwards between frames 4 and 5, 5 and 6, and 5 and 7. The two-way optical flow can also be computed between other associated frames and the reference frame, if needed. An optical flow module can be configured to compute the optical flow.

In step 110, the reference frames and one or more associated frames can be warped together. That is, backward and forward motion estimations can be computed explicitly (forward and backward in time) similar to step 105 with a warping module. More specifically, the warping module can generate a forward warping operator and a backward warping operator between the reference frame and each of the one or more associated frames. For example, frame 3 can be warped with frame 5 (forwards), and frame 5 can be warped with frame 3 (backwards), as well as forward and backwards estimations between frames 4 and 5, 5 and 6, and 5 and 7. As referenced later in equation (1) in step 120, step 110 can provide the warping operators, $W_{n \to ref}$ and $W_{ref \to n}$. The warping operators can represent forward and backward motion compensation, which is based on motion estimation, between the reference frame and each of the one or more associated frames.

In step 115, confidence weights, or weights, can be augmented, or assigned, to each of the warping operators. That is, weights for each of the forward warping operators and the backward warping operators can be computed in a weight module. The weights can correspond to uncertainty of motion estimation. In equation (1) in step 120, these weights are represented in the exemplary algorithm by $U_{n \to ref}$ and $U_{ref \to n}$. The weights can provide an error control between the reference and warped frames.

In step 120, a super-resolution iteration algorithm in accordance with an exemplary embodiment of the invention can be calculated. The exemplary algorithm can be $$I_H^{(k+1)} = I_H^{(k)} + \Delta t \left( \sum_{n=1}^{N} U_{n \to ref} W_{n \to ref} B D^T U_{ref \to n} \left( I_L^n - DB W_{ref \to n} I_H^{(k)} \right) + \lambda \frac{\partial R(\nabla I_H)}{\partial I_H} \right). \quad (1)$$

A super-resolution iteration module can be configured to calculate the exemplary super-resolution iteration algorithm.

The steps of the exemplary method 100 will be described in more detail below in conjunction with some further background of super-resolution iteration algorithms.

Super-resolution reconstruction is an inverse problem the goal of which is to recreate a higher resolution image from the sequence of low resolution images. The inversion can be performed with respect to the camera image formation process. This process can be modeled in system matrix notation as, $$I_L^n = DB W_n I_H + e_n, n=1 \ldots N \quad (2)$$

where $\{I_L\}_{n=1}^{N}$ is the set of low resolution images and $I_H$ respectively is the reconstructed high resolution image, D is a down sampling operator, B is a blurring matrix, $W_n$ is the warping matrix that describes scene motion, and $e_n$ is a Gaussian noise vector. Here the blurring and decimation operators are assumed to be constant throughout the image collection process. Additionally, the blur kernel is assumed to be a constant Gaussian across the entire image.

The common variational approach can be to minimize the difference between the observed images $\{I_L\}_{n=1}^{N}$ and the warped, blurred, and decimated version of the estimated high resolution image $I_H$ while also enforcing a global smoothness constraint with addition of regularization term R [1-9], $$E(I_H) = \Sigma_{n=1}^{N} \|DB W_n I_H - I_L^n\| + \lambda R(\Delta I_H) \quad (3)$$

where λ is a regularization weight. The norm $\|\cdot\|$ in Eq. (3) is typically taken to be the L1 or L2 norm. Utilizing the L2 norm in the formulation of the data term in the functional (3) can provide faster convergence, and better image quality of the reconstructed image. The most frequently used regularization term R can penalize some norm of the image gradient.

The steepest descent iterations for the minimization problem (2) can be given by, $$I_H^{(k+1)} = I_H^{(k)} + \Delta t \left( \sum_{n=1}^{N} W_n^T B^T D^T (I_L^n - DBW_n I_H^{(k)}) + \lambda \frac{\partial R(\nabla I_H)}{\partial I_H} \right), \quad (4)$$

where $^T$ denotes the adjoint operator, which in the case of the linear operator $D^T$ indicates upsampling without interpolation and in the case of blurring operator one can obtain that $B^T=B$ due to the symmetry of the Gaussian kernel. Warping operators $W_n^T$ and $W_n$ can represent forward and backward motion compensation, which can require sub-pixel precision motion estimation between the frames. In practice, the warping operation can be performed by interpolating the image onto the grid distorted according to the estimated optical flow field.

The accuracy of the warping operators can define the resolution gain attainable by super-resolution processing. Motion compensation can be the weakest link of the SR algorithm presented by Eq. (4). The motion compensation error can be most closely related to the interpolation error of optical flow, which can be used to demonstrate the challenge of obtaining an accurate motion compensated image. As known to one of ordinary skill in the art, to the date the interpolated images in the Middlebury database obtained by all of the state-of-the-art optical flow algorithms contain significant image artifacts spanning number of pixels in the image regions where the most complex motion is present (for example, "Backyard" and "Basketball" image pairs).

As a contrast to these interpolation results super-resolution processing requires sub-pixel accuracy to be able to enhance spatial resolution of low-resolution images. The motion compensation problem for super-resolution can be further exacerbated compared to optical flow interpolation problem since it is necessary to compute optical flow not just between two frames that are relatively close to each other in time but between all the frames in the sequence. This results in accumulation of even more complex motion patterns and hence even larger errors. Therefore, functional minimization based on Eq. (3) tends to converge to erroneous local minima without resolving image regions containing motion, and the iterations of Eq. (4) actually diverge in the Peak Signal-to-Noise-Ratio (PSNR) sense.

A natural way to stabilize SR iterations in Eq. (3) is to introduce a weighted norm formulation, $$E(I_H) = \Sigma_{n=1}^{N} (DBW_n I_H - I_L^n) U_n (DBW_n I_H - I_L^n) + \lambda R (\Delta I_H), \quad (5)$$

where in the most general sense, the weights $U_n$ represent confidence or conversely uncertainty of the estimation of the $DBW_n$ image formulation operator. As noted, the accuracy of the combined $DBW_n$ operator is generally limited by the accuracy of the warping operator $W_n$; therefore, the weights can be determined primarily by confidence in the estimation of this operator. Previously the weights in the Eq. (5) have not been defined for OF based warping involving a pixel-by-pixel approach. Instead the weights have been used in region based approaches to approximate registration error in image sequences with motion limited to global shifts, and affine model.

To achieve the high fidelity warping necessary to super-resolve image sequences with more complex motion patterns, two modifications to Eqs. (4) and (5) can be made. The first modification is a warping error reduction step that includes separate estimation of the forward and adjoint warping operators, $W_n$ and $W_n^T$. Indeed, for relatively simple motion patterns OF between the frames can be considered symmetric and therefore forward warping can be obtained from the backward warping simply by changing the sign of the underlying OF field (u, v): $W_n(u, v) \approx W_n^T(-u, -v)$. This approximation has dominated super-resolution algorithms regardless of the motion patterns under consideration. However, for complex motion fields, this symmetry does not hold mainly due to occlusions, but also due to slight asymmetry of the estimation algorithms. Therefore, it becomes necessary to directly compute estimates of both the forward and backward flow field. The computation of both forward and reverse OF estimates can be referred to as double estimation.

Generally, there are two ways to accomplish motion estimation in the sequence of low resolution images. The first is to compute OF between pairs of consecutive images and the second is to compute OF between each image and a reference image. In the first approach, OF between frames distant in time is computed by simple vector addition of motion fields estimated for consecutive image pairs set inside that time interval. Ideally, each such OF calculation attains higher accuracy compared to the second approach calculation because of the smaller displacements and simpler motion patterns. In practice this advantage can be offset in the second approach by initializing each OF field with the motion field already estimated for the neighboring frame. On the other hand, the first approach can guarantee that OF error accumulates far beyond the sub-pixel level and precludes any viable tracing of OF error propagation. In the proposed algorithm, the second approach that allows for OF error control can be utilized.

The second modification can be an assignment of two separate confidence weights, $U_n^F$; and $U_n^B$, to each of the warping operators, $W_n$ and $W_n^T$. The weights must act after each warping operation otherwise the confidence is assigned to the coordinates from which the pixels are then shifted. As a result, the system of the two separate confidence measure does not conform to the formulation of Eq. (6); and instead, is introduced directly into Eq. (5). Proposed implementation of these two separate warping operator weights can be based on a pixel-by-pixel approach of OF uncertainty measures and therefore can be referred to as double uncertainty. Therefore, the final form of super-resolution iterations in the Double Uncertainty Double Estimation algorithm can be described by Eq. (1), in which the indexes n→ref and ref→n denote an image warping towards the reference image and vice versa. The resulting minimization procedure puts heavier emphasis (i.e., larger weights) on the pixels with easily estimated motion which consists of short translations. Such pixel values can be established after a relatively small number of iterations.

The values of pixels with small weights indicating potential motion compensation errors can be determined after a larger number of iterations. These necessary extra iterations set up mild instabilities along the image edges with larger weights resulting in ripples along those edges. Artifacts created by this procedure can be removed using sparse filtering. The Block Matching and 3-D filtering (BM3D) algorithm can be used due to its ability to preserve edge sharpness. It can decompose image into patches, which can be grouped by block matching. Blocks with similar content, as defined by the L2 norm distance between their pixels, can be arranged into 3-D arrays. The filtering procedure can involve a 3-D transform represented by separable composition of a 2-D discrete cosine transform for every two-dimensional block, and a 1-D Haar transform in the third array dimension spanning across the group of blocks. The sparsity of the signal can be enforced by 1-D transform-domain spectral shrinkage attenuating the noise. The inverse 3-D transform can produce estimates of all the blocks, which can then be placed back to their original positions.

The exemplary Double Uncertainty Double Estimation algorithm can be universal with respect to the chosen OF estimation algorithm. However, one of ordinary skill in the art will understand that the choice of OF algorithm can define the quality of super-resolved image.

The confidence weights U in Eq. (1) can be approximated by a measure of OF interpolation error. The subtle difference between the two lays in the warping procedure. In super-resolution, only the target image can be used to perform the warping, while in the OF interpolation error definition, both the reference and the target images can be used to perform the warping. Use of the single image in super-resolution warping does not provide effective handling of occlusions, which can mean slight underestimation of warping operator error by an OF interpolation error measure.

Two measures have been shown to describe OF interpolation error accurately. The first measure is an uncertainty measure based on the difference of the reference image $I_1$ and the motion compensated version of the target image $I_2$, $$\phi = |I_1(r) - I_2(r+u)|. \quad (6)$$

The second measure can also be an uncertainty measure that represents the final value of the functional $E_{opt\_fi}$ after minimization. The first measure can be more precise in describing the highest error pixels. For example, it contains no explicit smoothing part, which can contribute strongly to the problematic pixel values of the functional based measure reducing the functional energy, but not necessarily reducing interpolation error. However, the warping based measure can be noisy for the same reason that it lacks the explicit smoothing part. The noise in the uncertainty measure tends to propagate into the noise in the super-resolved image, and to avoid that, Gaussian smoothing filter can be applied. To fit Eq. (1) definition the uncertainty measure $\phi$ needs to be inverted into a confidence measure with a normalized dynamic range, $$U = G_\rho * \exp(-\phi/a), \quad (7)$$

where a represents a scaling factor which can depend on the dynamic range of the image.

One of ordinary skill in the art will understand that the low-resolution test images for super-resolution processing can generated by using the human motion image sequences from the Middlebury database. For example, the 8-frame "Walking" sequence, the 8-frame "Basketball" sequence, and the 10-frame "Foreman" sequence can all be utilized. Though, not described in detail herein, it can be clear that performance of any super-resolution algorithm depends strongly on the complexity of the motion present in the processed image sequence. For the exemplary embodiment described herein, not only does the proposed super-resolution algorithm perform better than the state-of-art super-resolution algorithms, but also the performance gap widens with increasing complexity of the motion pattern.

Furthermore, the super-resolution iterations of the exemplary algorithm (see Eq. (1)) can converge to a constant peak signal-to-noise ratio (PSNR) value after approximately 100 steps for all image sequences. To illustrate the importance of introducing separate forward and backward warping operators from step 110, along with the corresponding confidence measures in step 115, when sequences are processed without those features, the corresponding PSNR values are much lower.

In summary, a novel multi-frame super-resolution algorithm enabling resolution enhancement of complex motion patterns is proposed. The presented algorithm can employ an OF based variational formulation of the super-resolution problem, which previously has been unable to produce high-resolution images free of distortion in sequences containing localized, non-rigid, and large displacement motion. Because motion estimation errors are responsible for the major classical super-resolution limitations the described approach concentrates on OF interpolation error reduction and control. First, the variational formulation can be augmented with warping based on two way OF estimation the error reduction advantage of which is demonstrated for a number of OF algorithms. Second, in super-resolution iterations each warping operator can be supplemented by confidence weights based on uncertainty measure of OF interpolation error. The algorithm's advantage in terms of image quality and spatial resolution can be demonstrated with respect to existing state-of-the-art super-resolution algorithms using challenging human motion image sequences.

Portions, or all, of the invention can comprise a computer program that embodies the functions described herein. Furthermore, the modules described herein, such as the optical flow module, warping module, weight module, and super-resolution iteration module, can be implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer implemented tool is explained herein in more detail read in conjunction with the figures illustrating the program flow.

It should be understood that the foregoing relates only to illustrative embodiments of the present invention, and that numerous changes may be made therein without departing from the scope and spirit of the invention as defined by the following claims.

The invention claimed is:

1. A computer implemented method, comprising the steps of:

computing, via one or more processors, a two-way optical flow between a reference frame and one or more associated frames;

generating, via said or another one or more processors, a forward warping operator and a backward warping operator between the reference frame and each of the one or more associated frames in a warping module;

computing, via said or another one or more processors, uncertainty of motion estimation weights for each of the forward warping operators and the backward warping operators in a weight module; and calculating, via said or another one or more processors, a super resolution iteration algorithm in a super-resolution iteration module, wherein the super resolution iteration algorithm is $$I_H^{(k+1)} = I_H^{(k)} + \Delta t \left( \sum_{n=1}^{N} U_{n \to ref} W_{n \to ref} BD^T U_{ref \to n} \left( I_L^n - DBW_{ref \to n} I_H^{(k)} \right) + \lambda \frac{\partial R(\nabla I_H)}{\partial I_H} \right),$$

and wherein $I_L^n$, n =1... N is a set of collected low resolution images $I_H$ is a reconstructed high resolution image, D is a down sampling operator, $D^T$ is an upsampling operator, B is a blurring matrix, W is a warping matrix that describes scene motion, U is an uncertainty of motion estimation, ref is a reference frame and n is a warped frame such that indexes n → ref and ref → n denote an operation towards the reference frame and vice versa, $\Delta t$ is iteration time step, $\lambda$ is a regularization multiplier, $R(\nabla I_H)$ is a regularization term, and k is the iteration step.

2. The method of claim 1, wherein the step of generating the forward warping operator and the backward warping operator is computed explicitly forward and backward in time.

3. The method of claim 1, wherein the forward warping operator and the backward warping operator provide motion compensation between the frames.

4. A computer implemented system, comprising:
an optical flow module configured to compute a two-way optical flow between a reference frame and one or more associated frames, wherein the optical flow module is implemented in a computer system that comprises instructions stored in a machine-readable medium and a processor that executes the instructions;
a warping module configured to provide motion compensation between the reference frame and each of the one or more associated frames, wherein the warping module is implemented in a computer system that comprises instructions stored in a machine-readable medium and a processor that executes the instructions;
a weight module configured to compute uncertainty of motion estimation weights for each of the forward warping operators and the backward warping operators, wherein the weight module is implemented in a computer system that comprises instructions stored in a machine-readable medium and a processor that executes the instructions; and
a super-resolution iteration module configured to calculate a super resolution iteration algorithm, wherein the super-resolution iteration module is implemented in a computer system that comprises instructions stored in a machine-readable medium and a processor that executes the instructions,
wherein the super resolution iteration algorithm is $$I_H^{(k+1)} = I_H^{(k)} + \Delta t \left( \sum_{n=1}^{N} U_{n \to ref} W_{n \to ref} BD^T U_{ref \to n} \left( I_L^n - DBW_{ref \to n} I_H^{(k)} \right) + \lambda \frac{\partial R(\nabla I_H)}{\partial I_H} \right),$$

and wherein $I_L^n$, n=1... N is a set of collected low resolution images $I_H$ is a reconstructed high resolution image, D is a down sampling operator, $D^T$ is an upsampling operator, B is a blurring matrix, W is a warping matrix that describes scene motion, U is an uncertainty of motion estimation, ref is a reference frame and n is a warped frame such that indexes n→ ref and ref→ n denote an operation towards the reference frame and vice versa, $\Delta t$ is iteration time step, $\lambda$ is a regularization multiplier, $R(\nabla I_H)$ is a regularization term, and k is the iteration step.

5. The warping module of claim 4, configured to provide motion compensation between the reference frame and each of the one or more associated frames by generating a forward warping operator and a backward warping operator between the reference frame and each of the one or more associated frames.

6. The method of claim 1,
wherein the step of computing uncertainty of motion estimation weights includes computing the uncertainty according to the equation $U = G_\rho * \exp(-\phi/\alpha)$,
wherein $G_\rho$ is a Gaussian smoothing filter and $\phi$ is a difference between a reference image and a motion compensated version of a target image.

7. A computer implemented method, comprising the steps of:
computing a two-way optical flow between a reference frame and one or more associated frames in an optical flow module;
generating a forward warping operator and a backward warping operator between the reference frame and each of the one or more associated frames in a warping module;
computing weights for each of the forward warping operators and the backward warping operators in a weight module; and
calculating a super resolution iteration algorithm in a super-resolution iteration module,
wherein the super resolution iteration algorithm is $$I_H^{(k+1)} = I_H^{(k)} + \Delta t \left( \sum_{n=1}^{N} U_{n \to ref} W_{n \to ref} BD^T U_{ref \to n} \left( I_L^n - DBW_{ref \to n} I_H^{(k)} \right) + \lambda \frac{\partial R(\nabla I_H)}{\partial I_H} \right),$$

and wherein $I_L^n$, n=1... N is a set of collected low resolution images $I_H$ is a reconstructed high resolution image, D is a down sampling operator, $D^T$ is an upsampling operator, B is a blurring matrix, W is a warping matrix that describes scene motion, U is an uncertainty of motion estimation, ref is a reference frame and n is a warped frame such that indexes n→ ref and ref→ n denote an operation towards the reference frame and vice versa, $\Delta t$ is iteration time step, $\lambda$ is a regularization multiplier, $R(\nabla I_H)$ is a regularization term, and k is the iteration step.

* * * * *